United States Patent Office 2,980,640
Patented Apr. 18, 1961

2,980,640

POLYMERIC COMPOSITIONS

William E. Shoemaker, Baden, and Roger Macdonald, Hookstown, Pa., assignors to Koppers Company, Inc., a corporation of Delaware No Drawing. Filed Apr. 5, 1957, Ser. No. 650,844

5 Claims. (Cl. 260—28.5)

This invention relates to the preparation of thermoplastic mixtures of a resinous polymeric styrene with a rubbery polymeric butadiene and to the compositions and articles prepared therefrom. More particularly, it pertains to an improved process for preparing homogeneous polymeric styrene-rubber blends which can be easily molded, pigmented, and extruded into uniform sheets having a smooth and glossy appearance.

It is known, as more fully described in Ingram copending application Serial No. 508,827, filed May 16, 1955, now U.S. Patent No. 2,844,562, that thermoplastic blends of polymeric styrene and a rubbery polymeric butadiene having improved homogeneity and strength at weld lines can be prepared with ease by mechanically mixing into the blends a metallic peroxide of the group consisting of $MgO_2$, $CaO_2$, $ZnO_2$, $SrO_2$, $BaO_2$, and $PbO_2$, in certain prescribed amounts. While decided improvement of the order hereinabove defined is realized with blends of this description, for certain end-use applications these compositions lack in several aspects. For example, for extruded sheets a smoother surface is desired than obtainable with the blends of this earlier application. Similarly, for certain purposes, molded articles having glossier surface appearance are desired. For still other applications increased impact strength is highly desired.

In accordance with the present invention, we have found, unexpectedly, that shortcomings in surface smoothness, gloss of molded articles, and desired impact strength of products prepared from the compositions of the foregoing application can be improved considerably by addition of a wax or a wax-like substance to the composition within certain limits. Specifically, we have found that the addition of a waxy substance in small amount materially enhances the aforementioned properties with attendant economic advantages in commercial attractiveness of articles prepared therefrom. Additionally, increase in impact strength of molded articles is obtained.

As used in the present specification and in the claims, the term "polymeric butadiene" is defined as a conventional "hot" or "cold" rubbery butadiene homopolymer or copolymer such as butadiene-styrene copolymer, butadiene-acrylonitrile copolymer, polybutadiene, etc., in which copolymers the butadiene is present to an extent of at least about 45% by weight.

The high molecular weight molding grate polymeric styrene utilized in this invention advantageously has a molecular weight of about 50,000 to about 100,000 (Staudinger method), although other high molecular weight molding grade polymeric styrenes can be used. Included in the term "polymeric styrene" are homopolymers, copolymers and terpolymers of styrene. Suitable comonomers in preparing resinous polymeric styrenes are: butadiene, acrylonitrile, alpha-methylstyrene, vinylnaphthalenes, nuclear-substituted styrenes, such as alkyl styrenes, chlorostyrenes, cyanostyrenes, etc. In place of styrene various nuclear-alkyl styrenes having no more than a total of six carbon atoms in the alkyl substituents, such as methyl styrenes, dimethyl styrenes, ethyl and diethyl styrenes, etc., as well as chloro and dichlorostyrenes, can be substituted for styrene in the practice of this invention. Resinous polymeric styrenes advantageously used in this invention have a relative viscosity of about 1.9–2.8, preferably about 2.1–2.5 (1 g./100 mls. toluene at 30° C., $$\text{Relative viscosity} = \frac{\text{solution viscosity}}{\text{viscosity of toluene}}$$

at 30° C.). Compositions prepared from higher molecular weight polymeric styrene, ca. 60,000 and above, generally have greater impact strengths than those prepared from lower molecular weight polymeric styrene, ca. 50,000 and below.

The wax or wax-like substances which can be used to advantage in the process of the present invention are employed in an amount up to 10% by weight of the composition (wax, polymer, and rubber). Preferably, from about 1 to about 5%, is employed. The most important consideration in selecting a waxy material is that it be meltable and blendable with the other components of the composition under the blending conditions employed as well as under the conditions of molding or extruding employed.

Plasticizers may be employed in an amount of from 0 to 10%. Since the wax exerts a plasticizing effect upon the composition the percentage of plasticizer can be reduced or eliminated when higher percentages of wax are employed.

The proportions of resinous polymeric styrene and rubbery polymeric butadiene which can be used to advantage, vary between about 70 to 96 weight percent of the composition (polymer, rubber, and wax) to about 20 to 3 weight percent of the composition. If a plasticizer is employed, generally, proportions up to about 10% by weight of the total batch can be employed. However, as mentioned above, if a high percentage of wax is employed, a plasticizer is not required. Among the plasticizers found suitable are butyl stearate, butyl Cellosolve stearate, dibutyl phthalate, tricresyl phosphate, mineral oil, low molecular weight plasticizing grade polystyrene, styrene- and alpha-methylstyrene dimers and trimers, etc.

As described in our copending application, it is not necessary to use pure $ZnO_2$ or other indicated equivalent metal peroxide. On the contrary, commercial or technical grade metal peroxides such as technical $ZnO_2$ (ca. 50% $ZnO_2$ and 50% $ZnO$) are advantageously used since they are more readily available and are more economical. Generally, up to 0.15 weight percent $ZnO_2$ (100% basis) or equivalent of other metal peroxide is used. At least about 0.03 weight percent $ZnO_2$ or equivalent metal peroxide on a polymeric styrene-polymeric butadiene basis, is generally desired in preparing the improved homogeneous blends of this invention, while more than about 0.15% $ZnO_2$ or equivalent is not of sufficient additional value to warrant the increased cost. $ZnO_2$ is the metal peroxide of choice because it is non-toxic, is relatively less water-sensitive than other metal peroxides, and has a white color. Other metal peroxides are useful where color is immaterial or where manufacturing procedures are modified to provide anhydrous incorporation, or where exposure to toxic effects can be avoided.

The mechanical mixing of resinous polymeric styrene with rubbery polymeric butadiene in the presence of the aforedescribed quantities of wax or wax-like material and metallic peroxide in accordance with this invention can be carried out in conventional mixing apparatus. Such mixing is performed with cooling if necessary to prevent the batch temperature from exceeding 450° F., for a time sufficient to obtain optimum dispersion and mixing of all of the components. Generally, the temperature is maintained at from about 280° F. to about 450° F. The time required for mechanical mixing varies with the size and proportions of the batch components, the temperature, and the type of mixer employed. Usually less than one hour and in most instances less than ½ hour is sufficient. The blends prepared in this manner may be used immediately after mixing and blending in the preparation of sheet material by extrusion or in the manufacture of molded articles, which operations can be performed at lower temperatures, 50° F. or more, than required for extruding or molding blends prepared without metallic peroxides and the waxy materials of the invention.

The following examples are given by way of illustration and not by way of limitation. All parts and percentages are by weight unless otherwise specified.

EXAMPLE I

The following two compositions, designated A and B respectively, were prepared.

(A) A mixture was prepared of 88 parts molding grade polystyrene having a relative viscosity of 2.25 (1% in toluene) and containing 4 parts of a wax known as Petronauba F, described by its manufacturer as a cream-colored microcrystalline wax having a minimum melting point of 180° F. (as determined by ASTM D127–30) and a saponification number of 50/60, 8 parts of a conventional "cold" rubber copolymer of 23.5% styrene and 76.5% butadiene. To this mixture 0.088 part technical grade $ZnO_2$ was added and the whole blended by conventional means, the temperature rising to about 420° F. The batch was then cooled and granulated for molding and sheeting purposes.

A sheet was extruded from the granulated powder. Examination of this sheet showed substantially no bumpiness. Using a Gardner glossmeter with a 60° head, the glossmeter reading was 17.

A molded Izod ⅛ in. notched specimen had an impact strength of 1.86 ft. lbs./in.

(B) A second composition was prepared in which the wax was omitted and the polystyrene content increased to 92 parts, the other components, mixing and granulating procedures remaining the same as in the preparation of composition A. A sheet extruded from the resulting composition, using the same glossmeter with a 60° head, had a glossmeter reading of 12. Visually, the surface was rough and very bumpy and, for these reasons, commercially unattractive. Notched Izod impact strength of a ⅛ in. molded specimen was 1.15 ft. lbs./in.

Comparison of the results illustrates convincingly that extruded sheet from Composition A is substantially improved in appearance. Similarly, there is a considerable improvement in the impact strength of a molded specimen.

EXAMPLE II

The following two compositions were prepared for the purpose of demonstrating improvement in glossiness and freedom from bumps and unevenness of an extruded sheet.

(A) Employing the same technique detailed in Example I, a composition was prepared having the following formulation:

*Composition A*

| | Parts |
|---|---|
| Polystyrene | 81 |
| "Cold" rubbery copolymer (23.5 styrene and 76.5 butadiene) | 12 |
| 190W wax, Bareco Oil Co. (a white microcrystalline wax melting at about 190° F.) | 2 |
| $ZnO_2$ | 0.132 |
| Low molecular weight polystyrene (10,000 to 30,000 molecular weight) | 5 |

*Composition B*

| | Parts |
|---|---|
| Polystyrene | 83 |
| "Cold" rubbery copolymer (23.5 styrene and 76.5 butadiene) | 12 |
| $ZnO_2$ | 0.132 |
| Low molecular weight polystyrene (10,000 to 30,000 molecular weight) | 5 |

Sheets were extruded from the foregoing blends. The glossmeter reading for the sheet prepared from Composition A was 26 and the sheet was essentially free of bumps. The glossmeter reading for the sheet extruded from Composition B was 18 and the surface of the sheet was considerably marked with bumps. Comparison of these results show in A a commercially attractive and usable product as against an unmarketable product for Composition B.

EXAMPLE III

Improvement in impact strength for compositions of this invention is further illustrated by testing the Izod notched impact strength of a ⅛ in. specimen molded from the following composition.

*Composition B*

| | Parts |
|---|---|
| Polystyrene | 78 |
| "Cold" rubbery copolymer (23.5 styrene and 76.5 butadiene) | 12 |
| 190W wax | 2 |
| Butyl Cellosolve stearate | 3 |
| Zinc stearate | .125 |
| $ZnO_2$ | .13 |
| Di-t-butyl-para-cresol | .24 |
| Low molecular weight polystyrene (10,000 to 30,000 molecular weight) | 5 |

The Izod impact strength of a ⅛ in. notched specimen was 2.2 ft. lbs./in. The impact strength of several commercially available materials averages about 1.5 ft. lbs./in. The increase in impact strength is clear.

Advantageous results are also obtained when other rubbery butadiene-styrene and butadiene-acrylonitrile copolymers having 45% and more combined butadiene are substituted for the "cold" rubbery copolymer used in the foregoing examples. Similarly, marked improvement in product qualities results upon substitution of other "polymeric styrenes" as previously defined. Other metallic peroxides of the class hereinbefore described can be employed with equally advantageous results.

While in the foregoing examples the use of butyl Cellosolve stearate has been demonstrated as a plasticizer, other plasticizers of the group listed can be used.

The waxes and wax-like materials employed in the present process have a melting point, generally, within the range 120°–220° F.

While the compositions of the invention have been described as particularly suitable for extruding sheet and for molding purposes, they are used to advantage in many other ways. For example, in addition to sheet, the present compositions can be extruded in many shapes such as tube, pipe, rods, plates, panels, etc. Similarly, with respect to molding, they can be injection molded, compression molded, vacuum formed, etc.

What is claimed is:

1. The method of preparing thermoplastic compositions containing a resinous polymeric styrene and a rubbery polymeric butadiene which comprises preparing a blend consisting essentially of (A) 70 to 96 weight parts of a resinous polymeric styrene, (B) 3 to 20 weight parts of a rubber polymeric butadiene, and (C) 1 to 10 weight parts of a microcrystalline wax having a melting point of about 180–220° F. in the presence of a metallic peroxide of the group consisting of $MgO_2$, $CaO_2$, $ZnO_2$, $SrO_2$, $BaO_2$, $PbO_2$, and mixtures thereof in amounts from about 0.03 to 0.15 weight part zinc peroxide equivalent per hundred weight parts of said blend, by mechanically mixing said ingredients into a uniform mass at a temperature of about 280–450° F. for a time sufficient to obtain a homogeneous blend.

2. The method of claim 1 in which the mechanical mixing is continued for a period up to about one hour.

3. The method of claim 1 in which the rubbery polymeric butadiene has at least about 45 weight percent combined butadiene.

4. The method of claim 1 in which the rubbery polymeric butadiene has 76.5% combined butadiene and 23.5% combined styrene.

5. Method according to claim 1 wherein said blend contains up to 10% by weight of a plasticizer, based on the total weight of said blend.

References Cited in the file of this patent

UNITED STATES PATENTS

| | | |
|---|---|---|
| 2,396,920 | Larson | Mar. 19, 1946 |
| 2,540,996 | Ryden | Feb. 6, 1951 |
| 2,750,349 | O'Herren | June 12, 1956 |
| 2,808,386 | D'Alelio | Oct. 1, 1956 |
| 2,844,562 | Ingram | July 22, 1958 |

OTHER REFERENCES

Commercial Waxes, edited by H. Bennett, 1944, Chemical Publishing Co., Inc., Brooklyn, N.Y., page 331, first paragraph.